United States Patent [19]

Simmons

[11] Patent Number: 5,393,323
[45] Date of Patent: Feb. 28, 1995

[54] AROMATIC POLYETHERSULFONE GAS SEPARATION MEMBRANES

[75] Inventor: John W. Simmons, Wilmington, Del.

[73] Assignee: L'Air Liquide S.A., Paris, France

[21] Appl. No.: 147,596

[22] Filed: Nov. 5, 1993

[51] Int. Cl.$^6$ .................. B01D 53/22; B01D 71/68
[52] U.S. Cl. ........................... 95/45; 95/54; 96/14
[58] Field of Search .............. 95/45, 54; 96/10, 14; 210/500.41

[56] References Cited

U.S. PATENT DOCUMENTS

| | | | |
|---|---|---|---|
| 3,709,841 | 1/1973 | Quentin | 260/2.2 R |
| 3,855,122 | 12/1974 | Bourganel | 210/23 |
| 4,625,000 | 11/1986 | Chao et al. | 525/534 |
| 4,842,740 | 6/1989 | Chung et al. | 210/500.27 |
| 4,954,143 | 9/1990 | Scott et al. | 55/16 |
| 4,971,695 | 11/1990 | Kawakami et al. | 96/14 X |
| 5,000,763 | 3/1991 | Sanders, Jr. et al. | 96/14 X |
| 5,009,678 | 4/1991 | Bikson et al. | 55/16 |
| 5,034,034 | 7/1991 | Sanders, Jr. et al. | 96/14 X |
| 5,049,169 | 9/1991 | Teramoto et al. | 95/54 X |
| 5,071,448 | 12/1991 | Bikson et al. | 55/16 |
| 5,085,676 | 2/1992 | Ekiner et al. | 95/158 |
| 5,152,811 | 10/1992 | Sanders, Jr. et al. | 55/16 |
| 5,163,977 | 11/1992 | Jensvold et al. | 55/16 |
| 5,209,848 | 5/1993 | Jeanes et al. | 95/54 X |
| 5,248,319 | 9/1993 | Ekiner et al. | 95/54 |
| 5,266,100 | 11/1993 | Simmons | 96/14 X |

FOREIGN PATENT DOCUMENTS 58-008506  1/1983  Japan ...................... 96/14

*Primary Examiner*—Robert Spitzer

[57] ABSTRACT

Novel alkyl-substituted aromatic polyethersulfone gas separation membranes and the process of using such membranes to separate one or more gases from a gaseous mixture is disclosed. The polyethersulfones are formed from aromatic alcohols of the formula

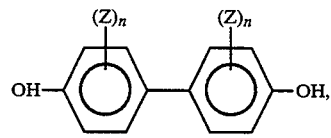

where Z is independently alkyl groups having 1 to 10 carbon atoms, most preferably a tertiary butyl group, n is an integer from 1 to 4, preferably 1.

6 Claims, No Drawings

AROMATIC POLYETHERSULFONE GAS SEPARATION MEMBRANES

FIELD OF THE INVENTION

The present invention relates to aromatic polyethersulfone gas separation membranes and the process for separating one or more gases from a gaseous mixture using such membranes. The polyethersulfones are derived from alkyl substituted aromatic alcohols. The inventive gas separation membranes exhibit exceptionally good permeation rates with good selectivity.

PRIOR ART

Aromatic polyethersulfones, particularly polyethersulfones made from aromatic alcohols are well known in the art. Gas separation membranes made from polyethersulfones are also known in the art. For example, U.S. Pat. No. 5,071,448 describes gas separation membranes made from alkyl substituted aromatic polyethersulfones. U.S. Pat. No. 5,163,977 describes a method of applying a non-ionic surfactant to polymeric gas separation membranes, including membranes made from substituted aromatic polyethersulfones. U.S. Pat. No. 5,152,811 describes a gas separation membrane made from aromatic polyethersulfones substituted with multiple radicals such as hydrocarbon radicals.

In addition, U.S. Pat. Nos. 3,709,841; 3,855,122 and 4,625,000 describe sulfonated aromatic polyethersulfones which may be fabricated into membranes which are useful for reverse osmosis processes.

The polyethersulfone membrane compositions of the prior art, although useful as gas separating membranes, not only suffer from the disadvantages of having to satisfy specific structural constraints, but are also difficult to fabricate into configurations such as hollow fiber membranes because these compositions tend to be soluble in relatively few solvents. Moreover, the membranes of the prior art tend to have relatively low flux. A need therefore exists for fluid separation membranes that avoid the fabrication and solubility problems of the prior art that also provide improved gas separation properties.

SUMMARY OF THE INVENTION

The present invention relates to certain substituted aromatic polyethersulfone separation membranes which are particularly useful for separating gases and the process for using them. This class of membrane materials compositionally contain alcohols which incorporate substituted aromatic units, preferably alkyl substituted aromatic units, more preferably alkyl substituted biphenol, most preferably tertiary butyl substituted biphenol. Membranes formed from this class of polyethersulfone materials exhibit superior gas permeability and good selectivity. It is believed that the high permeabilities of some gases from multicomponent mixtures is due to the molecular free volume in the polymer which is created by the alkyl substituents on the aromatic alcohols.

DETAILED DESCRIPTION OF THE INVENTION

The present invention relates to the discovery that gas separation membranes exhibiting exceptional gas permeability can be obtained by forming such gas separation membranes from polyethersulfones, which incorporate substituted aromatic alcohol having the structural formula

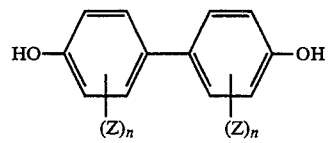

where Z is independently alkyl groups having 1 to 10 carbon atoms or aromatic groups having 6 to 12 carbon atoms, preferably a tertiary butyl group; and n is independently an integer from 1 to 4 inclusive, preferably 1.

The substituted aromatic alcohol of the present invention may be mixed with other aromatic alcohols. The substituted aromatic alcohol is by weight, preferably 10–100%, most preferably 50–100% of the total alcohol, and the other aromatic alcohol comprises preferably 0–90%, most preferably 0–50% of the total alcohol constituent.

Polyethersulfone separation membranes prepared from such alcohols possess an excellent balance of gas permeation rates and selectivities of one gas over other gases in a multicomponent gas mixture. The high gas permeability of these membranes is believed to be due to optimization of the molecular free volume in the polymer structure resulting from the incorporation of said substituted aromatic alcohols in the polyethersulfone chain. In particular, it is believed that the alkyl or aromatic substituents on the alcohol increase the molecular free volume of the polymer.

Generally, an inverse relationship between the gas permeation rate (flux) and the selectivity of the gas over other gases in a multicomponent gas mixture has been exhibited within polymer classes, such as polyethersulfones, polyesters, polyimides, polyamides and polyamide-imides. Because of this, prior art polyethersulfone gas separation membranes generally tend to exhibit either high gas permeation rates at the sacrifice of high gas selectivities or high gas selectivities at the sacrifice of high permeation rates. It would be highly desirable for gas separation membranes to exhibit high gas permeation rates while maintaining high gas selectivities.

The present invention circumvents the above shortcomings and provides exceptionally high permeation polyethersulfone gas separation membranes while maintaining good selectivity.

Polyethersulfone materials useful in the present invention are made from aromatic alcohols described above and aromatic dihalogenated-sulfones, such as 4,4'-difluorodiphenylsulfone. These dihalogenated-sulfones are not intended to be limiting as a wide variety of dihalogenated-sulfones may be used.

The polyethersulfones have the following repeating structure:

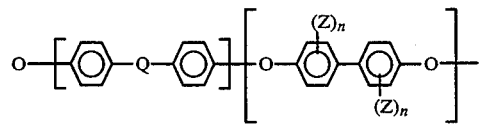

where Z and n are defined above.

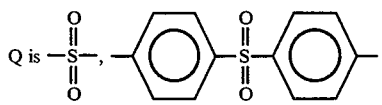

or mixtures thereof.

The polyethersulfone may be dipicted by the following repeating formula:

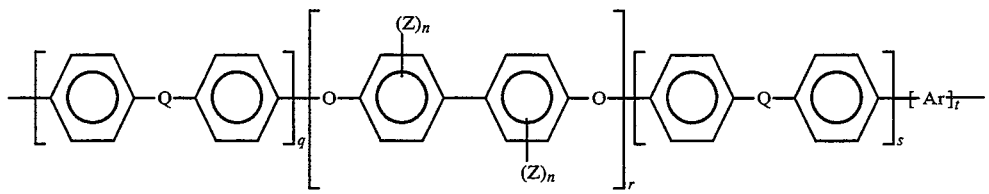

where Z, n and Q are defined above and Ar is any aromatic diol moiety. q, r, s and t are fractions from 0 to 1 where q+s=1 and r+t=1 with r>0 and preferably r is 0.5 to 1.0.

In general, the polyethersulfones of this invention have a weight average molecular weight within the preferred range of from about 10,000 up to about 1,000,000 and more preferably from about 50,000 up to about 200,000.

In the preferred process for preparing the polyethersulfone of this invention, approximately equimolar quantities of the alkyl-substituted aromatic alcohol and the aromatic dihalogenated-sulfones are reacted by well-established procedures known in the art, such as condensation polymerization or solution polymerization. Melt polymerization may also be used.

The resulting polyethersulfone may then, if desired, be blended with another polymer such as another polyether-sulfone using conventional solution blending technology to yield a blend having specifically tailored properties.

The preferred polyethersulfone compositions of the present invention are soluble in a wide range of ordinary organic solvents including most amide solvents such as N-methyl pyrrolidone, and several chlorinated solvents such as dichloromethane and trichloromethane. This is a great advantage for the ease of fabrication of industrially useful gas separation membranes. To prepare membranes in accordance with this invention, the polymer solution is cast as a sheet onto a support, or spun through a cored spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present.

Gas separation membranes prepared from the polyethersulfone materials of the present invention possess an excellent balance of gas permeation rates and selectivities for one gas over other gases in a multicomponent gas mixture. Generally, prior polyethersulfone gas separation materials exhibit an inverse relationship between the gas permeation rate and the selectivity of said gas over other gases in a multicomponent gas mixture. The preferred materials of the present invention (Example 1) have been found to have a permeation rate for oxygen of 7.79 Barrer while maintaining a good oxygen/nitrogen selectivity of 4.31.

The polyethersulfone described in this invention also have high inherent thermal stabilities. They are generally stable up to 350° C. in air or inert atmospheres. The glass transition temperatures of these polyethersulfone are generally above 150° C. The high temperature characteristics of these compositions can help to prevent the membrane compaction problems observed in other polymers at even moderate temperatures.

The polyethersulfone membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

The permeability of gasses through membranes is defined as the Barrer (B).

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein cm3/sec (STP) is the flux (flow rate) in units volume per seconds of permeated gas at standard temperature and pressure, cm. is the thickness of the film, cm$^2$ is the area of film, and cm. Hg is the pressure (or driving force).

The selectivity of a membrane in separating a two component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, a $O_2/N_2 = 10$ indicates that the subject membrane allows oxygen gas to pass through at a rate 10 times that of nitrogen.

The invention will now be further illustrated by way of the following Examples, which are considered to be illustrative only, and non-limiting.

EXAMPLES

General Solution Polymerization Procedure

The polyethersulfones of Examples 1–4 were prepared by the following procedure: A 3-necked round-bottomed flask equipped with a mechanical stirrer and a nitrogen inlet and a Dean-Stark trap was charged with the aromatic diols (Diol 1 and Diol 2 in the mole ratios indicated in Table 1) (1 equivalent), potassium carbonate (2.2 equivalents), the aromatic dihalogenated sulfones (Dihal 1 and Dihal 2 in the mole ratios indicated in Table 1 ) (1 equivalent). The condensation occurs under anhydrous conditions in an aprotic solvent (NMP or DMAC) with the azeotropic removal of water at elevated temperatures (150°–200° C.). Toluene is used as the azeotroping solvent. The polymer was precipatated into water and ground up in a blender, washed with water and then methanol (2 times), and air-dried overnight. The polymer was further dried in a vacuum oven at 230° C. for 2 hours.

General Film Forming Procedure

A film of each of the above polyethersulfone was cast from a 10 to 20% by weight N-methylpyrrolidone solution onto a glass plate at 120° C. with a 15-mil ($38 \times 10^{-5}$ m) knife gap. The film was dried on the plate at 120° C. for 60–90 minutes and then removed from the plate. The film was air dried overnight. The film was then further dried in a vacuum oven (2.67 kPa) at 230° C. for 18 hours.

The above films (film thicknesses = 1–2.5 mils) were tested for oxygen permeability ($P_{O_2}$) and mixed gas oxygen/nitrogen (21/79 mole ratio) permeabilities ($P_{O_2}/P_{N_2}$) at 500 psig ($34.5 \times 10^{-5}$ Pa) at 25° C. The results are reported in Table 1.

TABLE 1

| Ex. | Diol 1 (a) | Diol 2 (b) | Mole % (a)/ Mole % (b) | Dihal 1 (c) | Dihal 2 (d) | Mole % (c)/ Mole % (d) | $P_{O_2}$ (Barrers) | $P_{22}/P_{N_2}$ |
|---|---|---|---|---|---|---|---|---|
| 1 | A | D | 75/25 | X | — | 100 | 7.79 | 4.31 |
| 2 | A | E | 50150 | X | — | 100 | 2.62 | 6.04 |
| 3 | B | E | 50/50 | X | — | 100 | 4.31 | 5.99 |
| 4 | B | F | 50150 | X | — | 100 | 4.96 | 5.27 |

Legend
A = 3,31-Di-t-butyl-4,4'-dihydroxybiphenyl (DBBP)
D = 4,4'-[2,2,2-trifluoro (trifluoromethyl) ethylidene] bisphenol (TMBPF)
E = 4,4'-Isopropylidendiphenol, Bjsphenol A (BPA)
X = 4,4'-Difluorodiphenylsulfone (DFDPS)
B = 3,3',5,5'-tetramethyl-4,4'-dihydroxybiphenyl (TMBP)
F = Phenolphthalein

What is claimed is:

1. A gas separation membrane formed from an aromatic polyethersulfone comprising:

(a) at least one unit derived from the following formula:

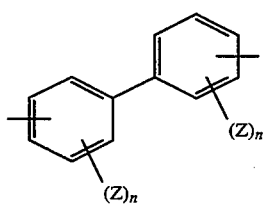

where Z is independently, alkyl groups having 1 to 10 carbon atoms, or aromatic groups having 6 to 12 carbon atoms; n is independently an integer from 1 to 4 inclusive

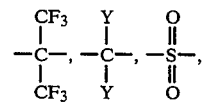
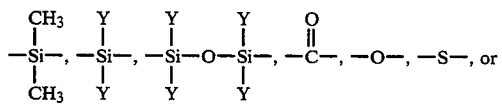
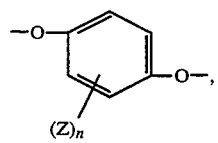

and (b) at least one unit derived from an aromatic dihalogenated sulfone.

2. The membrane of claim 1 where Z is a tertiary butyl group, n=1.

3. The membrane of claim 1 wherein unit (b) is derived from 4,4'-difluorodiphenylsulfone.

4. The membrane of claim 1 wherein unit (a) is derived from 3,3'-di-t-butyl-4,4'-dihydroxy biphenyl.

5. The membrane of claim 1 wherein the aromatic polyethersulfone has at least one of the following repeating unit:

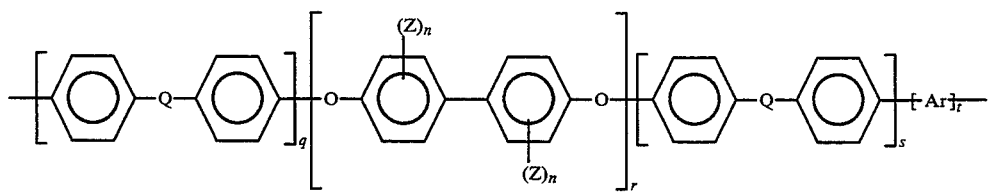

where Z is independently alkyl groups having 1 to 10 carbon atoms or aromatic groups having 6 to 12 carbon atoms; n is independently an integer from 1 to 4 inclusive;

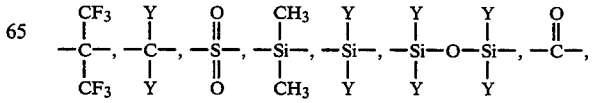

-continued

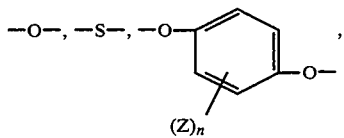

and Ar is any aromatic diol moiety; q, r, s and t are fractions from 0 to 1 where q+s=1 and r+t=1 with r>0; and

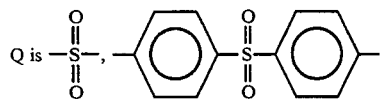

or mixtures thereof.

6. A process for separating one or more gases from a gaseous mixture comprising bringing said gaseous mixture into contact with the first side of the gas separation membrane of claim 1 in a manner to cause a portion of the mixture to pass through the membrane to a permeate side, the resulting gas mixture on the permeate side being enriched in one or more component over that of the mixture on the first side.

* * * * *